(12) United States Patent
Hariharan et al.

(10) Patent No.: US 10,903,745 B1
(45) Date of Patent: Jan. 26, 2021

(54) AVERAGE CURRENT MODE CONTROL ARCHITECTURE

(71) Applicant: Maxim Integrated Products, Inc., San Jose, CA (US)

(72) Inventors: Suresh Hariharan, Livermore, CA (US); Alfons Willy Leo Janssen, Bilthoven (NL)

(73) Assignee: Maxim Integrated Products, Inc., San Jose, CA (US)

( * ) Notice: Subject to any disclaimer, the term of this patent is extended or adjusted under 35 U.S.C. 154(b) by 165 days.

(21) Appl. No.: 14/991,396

(22) Filed: Jan. 8, 2016

Related U.S. Application Data

(60) Provisional application No. 62/161,718, filed on May 14, 2015.

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
CPC ......... H02M 3/156; H02M 2001/0009; H02M 3/158
See application file for complete search history.

(56) References Cited

U.S. PATENT DOCUMENTS

| | | | | |
|---|---|---|---|---|
| 6,369,555 | B2* | 4/2002 | Rincon-Mora | H02M 3/1563 323/222 |
| 8,058,932 | B2* | 11/2011 | Liu | H03K 7/08 327/172 |
| 2011/0018515 | A1* | 1/2011 | McCloy-Stevens | H02M 3/1588 323/284 |
| 2012/0194158 | A1* | 8/2012 | Lipcsei | H02M 3/1588 323/283 |
| 2015/0194892 | A1* | 7/2015 | Kudo | H02M 3/1588 323/271 |
| 2015/0207411 | A1* | 7/2015 | Calhoun | H02M 1/088 323/235 |

* cited by examiner

*Primary Examiner* — Jue Zhang
*Assistant Examiner* — Henry E Lee, III
(74) *Attorney, Agent, or Firm* — North Weber and Baugh LLP; Michael North

(57) ABSTRACT

A new architecture for buck LED drivers and buck DC-DC converters is disclosed for providing response to both line and loads. The architecture uses a new average current mode control scheme that does not use an error amplifier to regulate the current in the inductor in the buck converter. Even though there is no oscillator the switching frequency remains constant over line and load. The architecture provides a low cost solution with very fast response times.

15 Claims, 4 Drawing Sheets

AVERAGE CURRENT MODE CONTROL ARCHITECTURE

BACKGROUND

A. Technical Field

The present invention relates generally to a fast control architecture for DC-DC converter and method for its implementation for various DC-DC converters.

B. Background of the Invention

DC-DC converters have been used widely in various modern electronics, including automotive front lighting, automotive heads-up displays and consumer application, etc., to convert a source of direct current (DC) from one voltage level to another. Electronic switch-mode DC to DC converters convert one DC voltage level to another, by storing the input energy temporarily, typically in an inductor, and then releasing that energy to the output at a different voltage. By adjusting the duty cycle of the charging voltage, the output voltage can be controlled or maintained within a desired range.

DC-DC converters may use several control loop schemes, such as voltage mode control, peak current mode control and average current mode control. The use of amplifiers in the control loop for DC-DC converters generally slows down the response during line and load transients since the compensation capacitor in the control loop takes a finite time to change its voltage when requested by the control loop.

It would be desirable to have a DC-DC converter with a fast response for line and load transients for better dynamic performance.

SUMMARY OF THE INVENTION

Embodiments of the invention relate to a control architecture for DC-DC converter and method for its implementation for various DC-DC converters.

In various embodiments, a new architecture for DC-DC converters is provided for ultra-fast response to both line and loads. The architecture uses a new average current mode control scheme that does not use an error amplifier to regulate the current in the inductor in the buck converter. Even though there is no oscillator, the switching frequency remains constant. The architecture provides a robust solution with fast response time.

In one embodiment, the ON time is inversely proportional to the input voltage and also directly proportional to the output voltage. The output voltage is digitized and a multiplier is used to set the ON time. The OFF time programming is done by the average current mode comparator. The average programmed current is compared with a freewheeling diode current. The comparator output goes high at the start of the OFF period and goes low when the inductor current goes below the programmed current. The pulse width of the comparator output is doubled and sets the OFF period.

The control scheme only needs the average current mode comparator and the pulse width doubler. For higher operation accuracy, it is preferred that the inductor has continuous current, otherwise the accuracy may be affected negatively. The ripple of the inductor current does not affect the switching frequency as long as the current is continuous. Therefore, the switching frequency is basically fixed with continuous inductor current, which can be ensured by proper design and choice of operating parameters.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used for DC-DC converter architecture with preferred response to both line and loads. The architecture uses a new average current mode control scheme that does not use an error amplifier to regulate the current in the inductor in the buck converter. Even though there is no oscillator, the switching frequency remains constant. The architecture provides a robust solution with fast response time.

Figure 1:
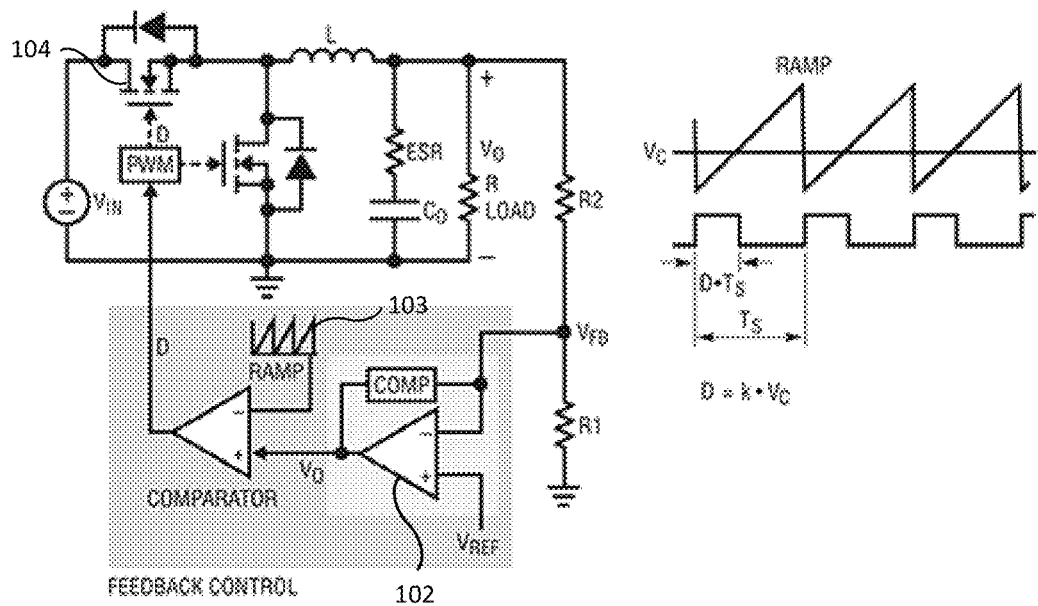
FIG. 1 is a prior art schematic diagram of a voltage mode controlled buck converter.

FIG. 1 is a prior art schematic diagram of a voltage mode controlled buck converter. In this control mode, the output voltage from the error amplifier 102 is compared with a saw tooth ramp 103 and the duty cycle of the top switch is D. The switching frequency is fixed at fs=1/Ts. The duty cycle for the ON period of the switch 104 is given by D=k·Vc, where Vc is the control voltage which is the output of the error amplifier and k is a constant. In this control mode, when the input voltage goes up the control voltage Vc has to go down so that the duty cycle D goes down. The output voltage Vo is given by Vo=D·Vin where Vin is the input voltage in volts and D is the duty cycle of the top switch.

Figure 2:
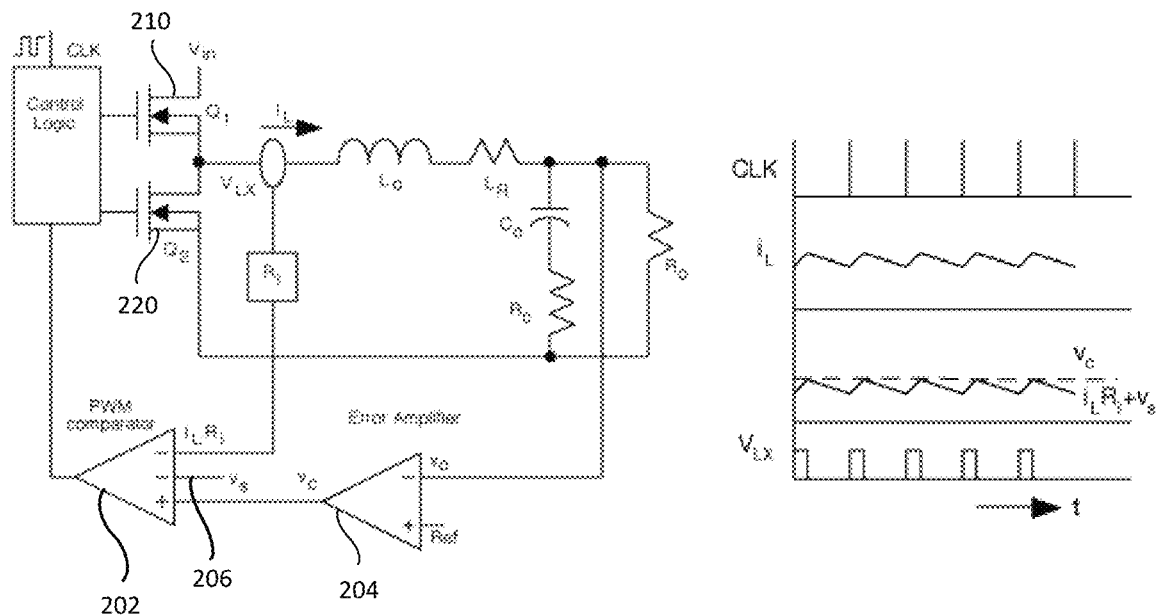
FIG. 2 is a prior art schematic diagram of a peak current mode controlled buck converter.

FIG. 2 is a prior art schematic diagram of a peak current mode controlled buck converter. In this control mode, the switching frequency is also held fixed. The current in the inductor Lo is sensed and the current sense voltage is fed to the negative input of a PWM comparator 202. The positive input of the PWM comparator 202 receives the output voltage Vc from an error amplifier 204. To avoid subharmonic oscillations, an additional slope compensation ramp (Vs) 206 is also added to the negative input of the PWM comparator. The switch Q1 210 is turned on (switch Q2 220 is turned OFF) when there is a pulse on the oscillator (not shown in FIG. 2), and is turned off (switch Q2 220 is turned ON) by the PWM comparator when the summation of the current sense signal ($i_L R i$) and slope compensation ramp Vs becomes equal to Vc.

Figure 3:
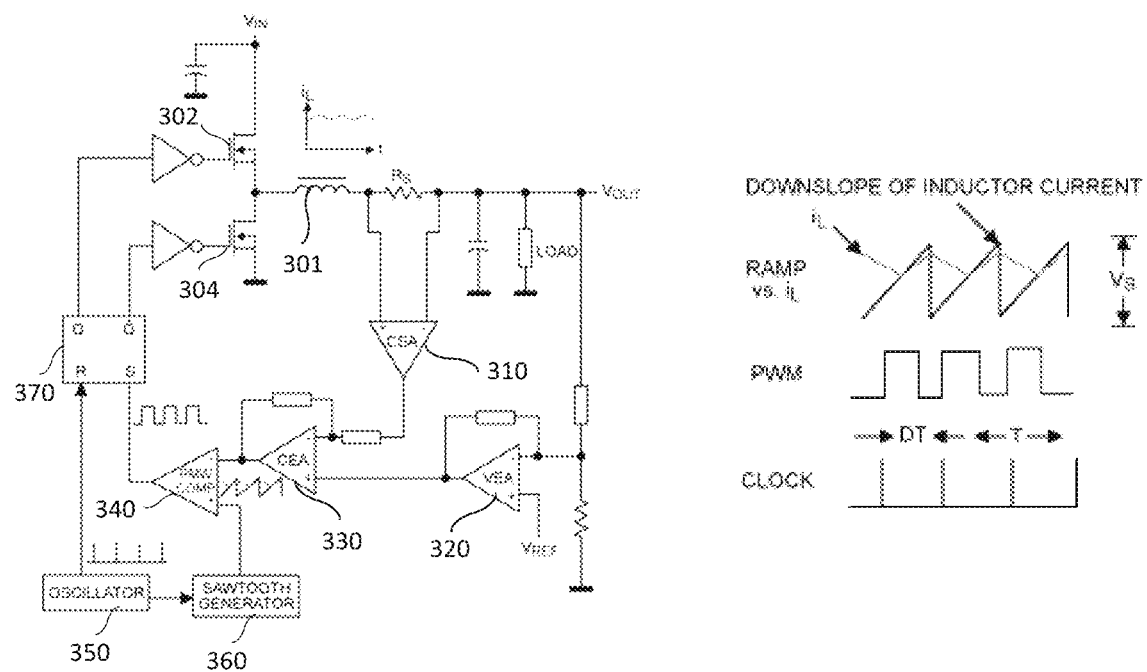
FIG. 3 is a prior art schematic diagram of an average current mode controlled buck converter.

FIG. 3 is a prior art schematic diagram of an average current mode controlled buck converter. In the control mode, a current-sense amplifier (CSA) 310 measures the current in the inductor 301. A voltage-error amplifier (VEA) 320 receives inputs from the output voltage and a reference voltage. A current-error amplifier (CEA) 330 receives inputs from the CSA 310 and the VEA 320. The output of the CEA 330 is fed to one input port of a PWM comparator 340 and a fixed frequency saw-tooth signal sequentially generated by an oscillator 350 and a saw-tooth generator 360 is fed to the other input port of the PWM comparator 340. The output of the PWM comparator 340 and the oscillator 350 are fed into a SR latch 370 for generation control signals for the switches 302 and 304. The high side switch 302 is turned on when the oscillator 370 outputs a pulse and is turned off when the output of the CEA 330 intersects the fixed frequency saw-tooth signal output from the saw-tooth generator 360.

The control mode as shown in FIGS. 1-3 uses amplifiers in the control loop and these amplifiers slow down the response during line and load transients since the inherent compensation capacitor in the control loop takes a finite time to change its voltage when requested by the control loop. Therefore, the dynamic performance during line and load transients is limited.

Figure 4:
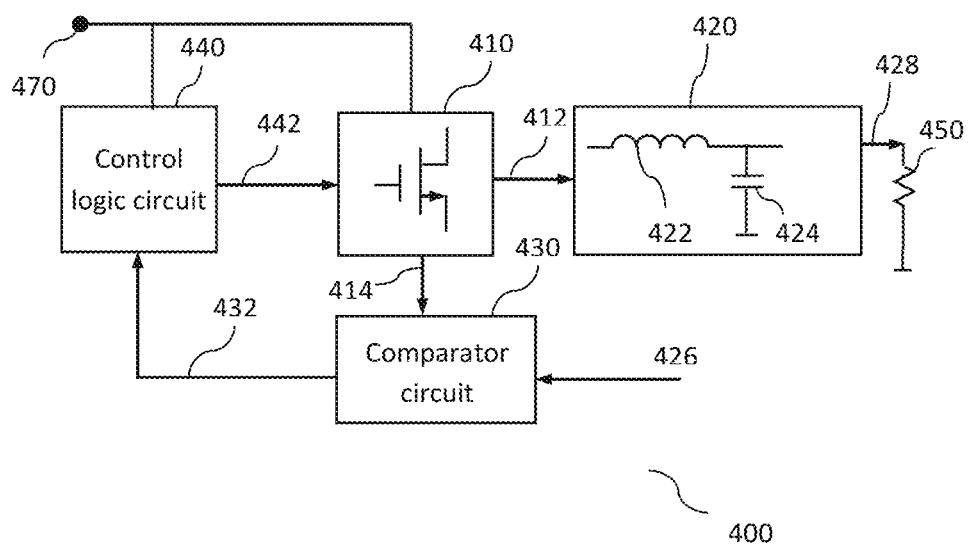
FIG. 4 is an exemplary block diagram of a DC-DC buck converter with fast line transient response according to various embodiments of the invention.

FIG. 4 is an exemplary block diagram of a DC-DC buck converter with fast line transient response according to various embodiments of the invention. The DC-DC converter 400 includes a power circuit 410, an external circuit 420, a control logic circuit 440 and a comparator circuit 430. The power circuit 410 comprises at least one controllable switch to regulate current from an input voltage 470. In one embodiment, the controllable switch may be a transistor switch, such as a p-channel or n-channel MOFET (metal-oxide-semiconductor field-effect transistor).

The external circuit 420 comprises at least one output inductor 422 and one output capacitor 424. The external circuit 420 receives an output 412 from the power circuit 410 and provides a final output 428 with a stable voltage value to the load 450. Typically, the output inductor is coupled in series between the power circuit 410 and the load 450. The output capacitor 424 is coupled in parallel to the load 450.

The comparator circuit 430 receives input from a reference signal 426 and a feedback signal 414 from the power circuit 410 to generate an output signal 432. The control logic circuit 440 receives the output signal 432 and generates a control signal 442 to control the at least one controllable switch within the power circuit 410. The control signal 442 may be a single-channel signal or a signal set comprising multiple channels.

In one embodiment, the feedback signal 414 from the power circuit 410 is a voltage signal related to the current of the output inductor 422. The comparator circuit 430 comprises no fixed frequency oscillator or amplifier, thus be able to provides a fast response toward input and output transients. In another embodiment, the control signal 442 controls the at least one controllable switch within the power circuit 410 such that at least one controllable switch has a ON time inversely proportional to the input voltage 470 and directly proportional to the output voltage 428.

It is understood that variations of this block diagram can also be used for other DC-DC converters such as boost and buck-boost converters. For example, the inductor 422 may couple to an input voltage and thus being an input inductor instead of an output inductor.

Figure 5:
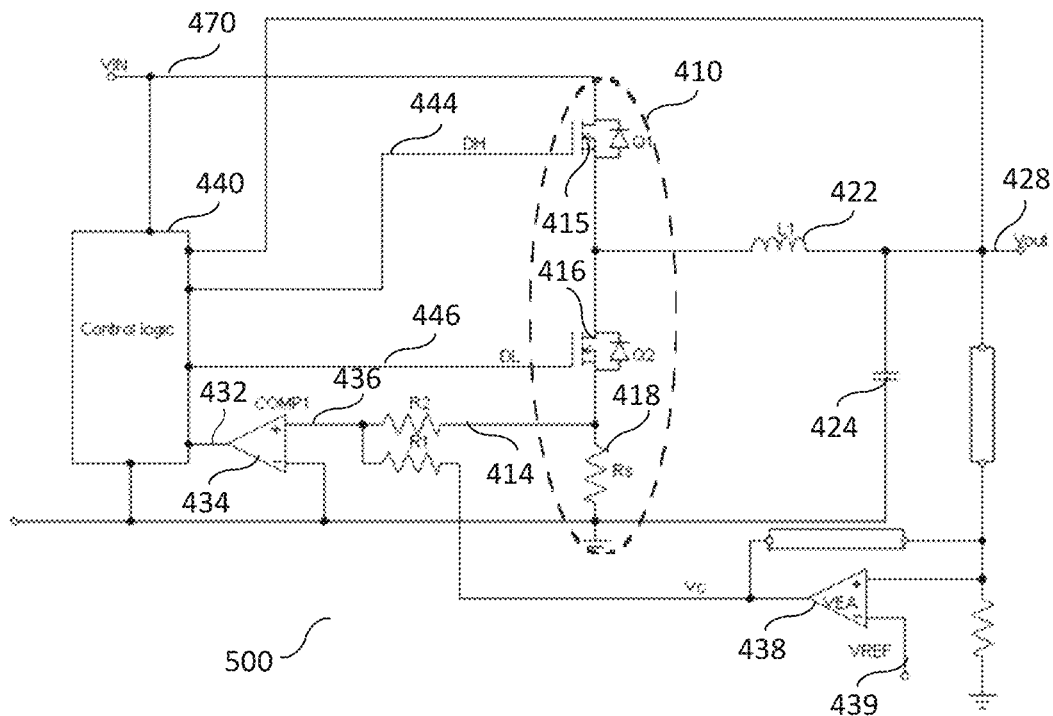
FIG. 5 is an exemplary schematic diagram of a DC-DC buck converter with fast line transient response according to various embodiments of the invention.
Figure 6:
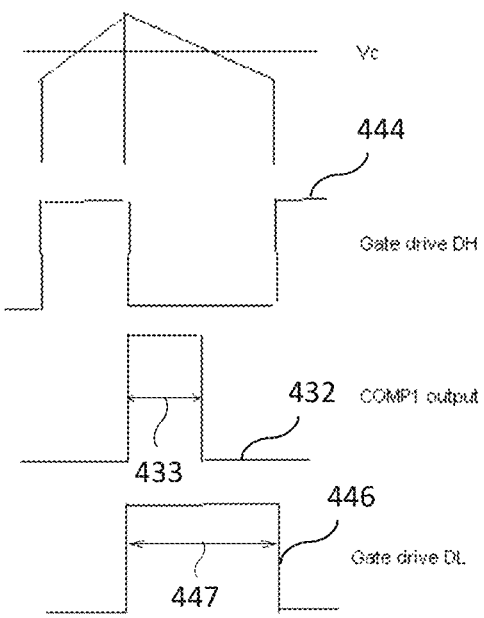
FIG. 6 is an exemplary control waveform for the DC-DC buck converter with fast line transient response according to various embodiments of the invention.

FIG. 5 is an exemplary schematic diagram of a DC-DC buck converter 500 with fast line transient response according to various embodiments of the invention. FIG. 6 is an exemplary control waveform for the DC-DC buck converter shown in FIG. 5. The power circuit 410 comprises two series connected controllable switches (415 and 416) and a current sensing resistor 418 coupled between the second controllable switch 416 and ground. The first controllable switches 415 couples between the input voltage 470 and the output inductor 422. The resistor 418 senses the current through the second controllable switch 416 and feeds the feedback signal 414 to an input port 436 of a comparator 434. In one embodiment, the same input port 436 of the comparator 434 is further coupled to an output of a voltage-error amplifier (VEA) 438, which receives inputs from the output voltage 428 (via a voltage divider) and a reference voltage 439. The feedback signal 414 and the output of a voltage-error amplifier (VEA) 438 are coupled to the input port 436 via a first coupling resistor R1 and a second coupling resistor R2 respectively. The first coupling resistor R1 and the second coupling resistor R2 may or may not have the same resistance value.

The control logic circuit 440 receives the output signal 432 from the comparator 434 and generates control signals 444 and 446 to control the first controllable switch 415 and second controllable switch 416 respectively. The ON time of the first controllable switch 415 is configured to be inversely proportional to the input voltage 470 and directly proportional to the output voltage 428. The on period Ton of the first controllable switch 415 is given by $$Ton = K \cdot Vout/Vin \quad (1)$$

where Vout is the output voltage, Vin is the input voltage and K is a constant.

When the first controllable switch 415 turns off, the second controllable switch 416 turns on. The output signal 432 of the comparator 434 goes high as soon as the first controllable switch 415 turns off and goes low when the current in the output inductor 422 reaches Vc/Rs, where Rs is the sense resistor 418 and Vc is the output of a voltage-error amplifier (VEA) 438. The value Vc/Rs is also the average inductor current (the average output current of the buck converter 500). Therefore, the output signal 432 of the comparator 434 is a pulse signal with a pulse width 433. The control logic circuit 440 receives the output signal 432 and generates the control signal 446 with a pulse width 447 double the pulse width 433 to control the second controllable switch 416.

The first controllable switch 415 and the second controllable switch 416 have reversed ON/OFF periods. The switching frequency (the first controllable switch 415 or the second controllable switch 416) is given by $1/(T_{on}+T_{off})$. In a buck converter $T_{off}$ is defined by:

$$T_{off}=(1-D)Ts \qquad (2)$$

where $Ts=(T_{on}+T_{off})$, D is the ratio between $T_{on}$ and Ts.

Given that Ton=K·Vout/Vin as described in equation (1), it is clear that the switching frequency does not change even with changes in input or output voltage. This provides a theoretically fixed frequency operation for variations in input and output voltages. In actual application there might be small variations in frequency due to the voltage drops in the switches 415 and 416 as well as voltage drops due to the equivalent resistance of the output inductor 422.

Although FIGS. 4 and 5 are shown with control scheme for a buck converter, it is understood that variations of this control scheme can also be used for other dc-dc converters such as boost and buck-boost converters.

Figure 7:
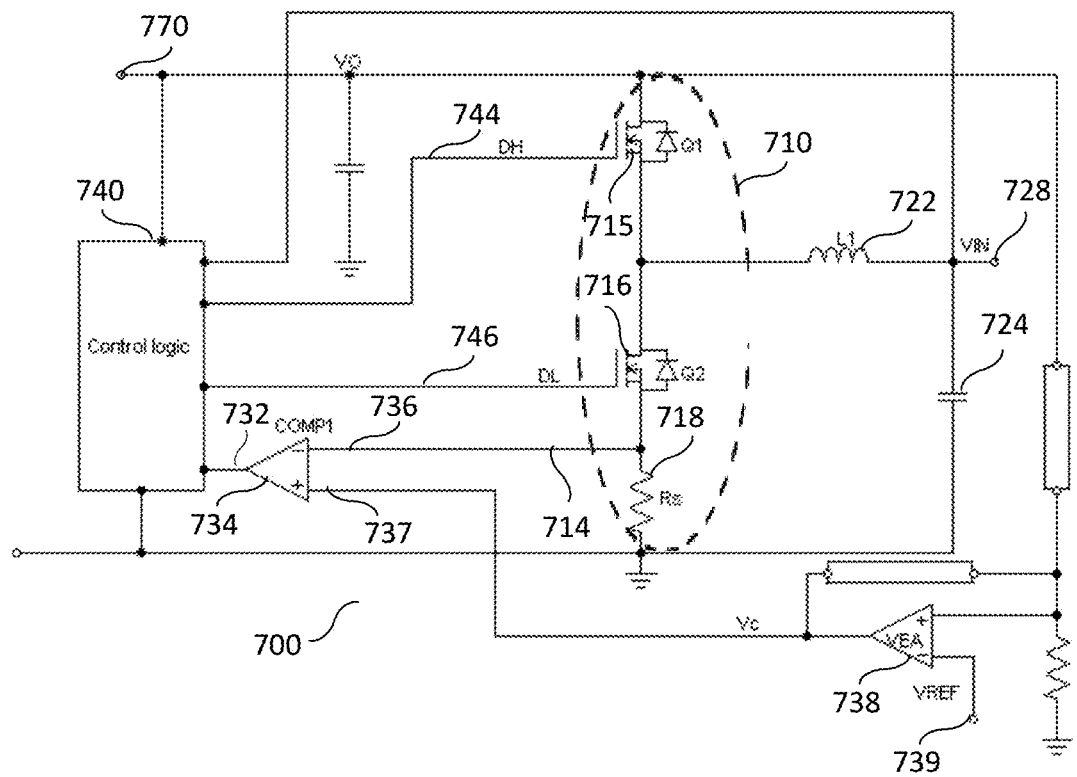
FIG. 7 is an exemplary schematic diagram of a DC-DC booster converter with fast line transient response according to various embodiments of the invention.
Figure 8:
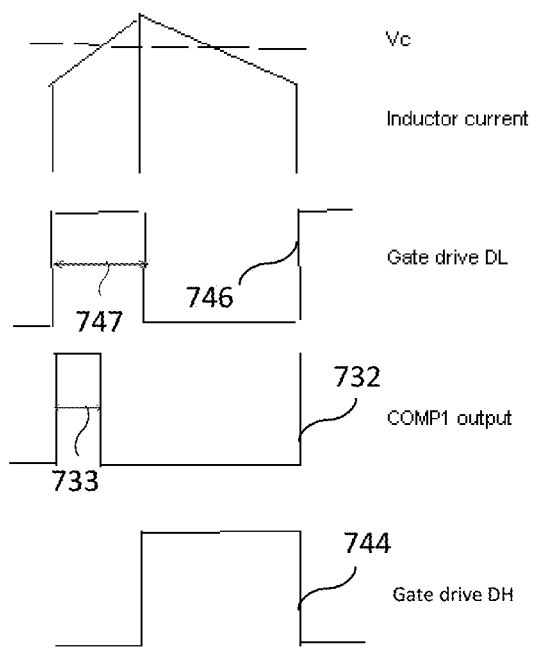
FIG. 8 is an exemplary control waveform for the DC-DC booster converter with fast line transient response according to various embodiments of the invention.

FIG. 7 is an exemplary schematic diagram of a DC-DC booster converter with fast line transient response according to various embodiments of the invention. FIG. 8 is an exemplary control waveform for the DC-DC booster converter shown in FIG. 7. In the boost converter the connections for the input and output are swapped as compared to FIG. 5. Also the connections to the comparator 734 are changed as shown.

The power circuit 710 comprises two series connected controllable switches (715 and 716) and a current sensing resistor 718 coupled between the second controllable switch 716 and ground. The first controllable switches 715 couples between the output voltage 770 and the input inductor 722. The external circuit in FIG. 7 comprises at least one output inductor 722 and one input capacitor 724. The resistor 718 senses the current through the second controllable switch 716 and feeds the feedback signal 714 to a first input port 736 of a comparator 734. A second input port 738 of the comparator 734 is coupled to an output of a voltage-error amplifier (VEA) 738, which receives inputs from the output voltage 770 (via a voltage divider) and a reference voltage 739.

The control logic circuit 740 receives the output signal 732 from the comparator 734 and generates control signals 744 and 746 to control the first controllable switch 715 and second controllable switch 716 respectively. The ON time of the first controllable switch 715 is configured to be inversely proportional to the input voltage 728 and directly proportional to the output voltage 770. The on period Ton of the first controllable switch 715 is given by $$Ton=K \cdot Vin/Vout \qquad (3)$$

where Vout is the output voltage, Vin is the input voltage and K is a constant.

Similar to the buck converter shown in FIG. 5, the output signal 732 of the comparator 734 is a pulse signal with a pulse width 733. The control logic circuit 740 receives the output signal 432 and generates the control signal 746 with a pulse width 747 double the pulse width 733 to control the second controllable switch 716.

The first controllable switch 715 and the second controllable switch 716 have reversed ON/OFF periods. The switching frequency (the first controllable switch 715 or the second controllable switch 716) is theoretically fixed if the conduction losses in the switches and the FR losses in the inductor 722 are ignored.

The foregoing description of the invention has been described for purposes of clarity and understanding. It is not intended to limit the invention to the precise form disclosed. Various modifications may be possible within the scope and equivalence of the application.

The invention claimed is:

1. A DC-DC buck converter comprising:
   a power circuit comprising at least one controllable switch to regulate current from an input voltage;
   an external circuit comprising at least one output inductor and one output capacitor, the external circuit receiving an output from the power circuit and providing a final output voltage to a load;
   a comparator circuit receiving a feedback signal from the power circuit and an output of a voltage-error amplifier (VEA) to generate an output signal, the feedback signal and the output of the VEA couple to a same input port of the comparator; and
   a control logic circuit receiving the output signal from the comparator circuit and generating a control signal to control the at least one controllable switch within the power circuit, the at least one controllable switch has an ON time inversely proportional to the input voltage and directly proportional to the final output voltage.

2. The DC-DC buck converter of claim 1 wherein the power circuit comprises a first controllable switch and a second controllable switch in series connection and a current sensing resistor coupled between the second controllable switch and ground, the first controllable switch coupled between the input voltage and the at least one output inductor, the current sensing resistor sensing the current through the second controllable switch and feeding the feedback signal to the same input port of the comparator circuit.

3. The DC-DC buck converter of claim 1 wherein the VEA couples to the final output voltage via a voltage divider.

4. The DC-DC buck converter of claim 1 wherein the same input port of the comparator circuit is coupled to the feedback signal and the output of the VEA via a first coupling resistor and a second coupling resistor respectively.

5. A DC-DC booster converter comprising:
   an external circuit coupled to an input voltage, the external circuit comprising at least one input inductor and one input capacitor;
   a power circuit coupled to the external circuit to provide a final output voltage to a load, the power circuit comprising a first controllable switch and a second controllable switch in series connection between the output voltage and ground;
   a comparator circuit receiving a feedback signal from the power circuit to generate an output signal; and
   a control logic circuit receiving the output signal from the comparator circuit and generating a control signal to control the at least one controllable switch within the power circuit, at least the first controllable switch has an ON time inversely proportional to the final output voltage and directly proportional to the input voltage.

6. The DC-DC booster converter of claim 5 wherein the power circuit further comprises a current sensing resistor coupled between the second controllable switch and ground, the first controllable switch coupled between the final output voltage and the at least one input inductor, the current sensing resistor sensing the current through the second controllable switch and feeding a feedback signal to an input port of the comparator circuit.

7. The DC-DC booster converter of claim 6 wherein the input port of the comparator circuit is further coupled to an output of a voltage-error amplifier (VEA), the VEA receiving inputs from the final output voltage and a reference voltage.

8. The DC-DC booster converter of claim 7 wherein the VEA couples to the final output voltage via a voltage divider.

9. The DC-DC booster converter of claim 7 wherein the input port of the comparator circuit is coupled to the feedback signal and the output of the VEA via a first coupling resistor and a second coupling resistor respectively.

10. A method for DC-DC conversion, the method comprising:
    coupling a power circuit comprising at least one controllable switch to an input voltage; coupling an the external circuit between the power circuit and a load, the external circuit comprising at least one output inductor and one output capacitor, the external circuit receiving an output from the power circuit and providing a final output voltage to the load;
    generating an output signal using a comparator circuit having an input port coupled to receive both a feedback signal from the power circuit and an output of a voltage-error amplifier (VEA); and
    generating a control signal using a control circuit based at least on the output signal from the comparator circuit to control the at least one controllable switch within the power circuit, the at least one controllable switch has an ON time inversely proportional to the input voltage and directly proportional to the final output voltage.

11. The method of claim 10 wherein the output signal from the comparator has an output signal pulse width, the control signal has a pulse width double the pulse width of the output signal pulse width.

12. The method of claim 10 wherein the power circuit comprises a first controllable switch and a second controllable switch in series connection and a current sensing resistor coupled between the second controllable switch and ground, the first controllable switch coupled between the input voltage and the at least one output inductor, the current sensing resistor sensing the current through the second controllable switch and feeding the feedback signal to an input port of the comparator circuit.

13. The method of claim 10 wherein the VEA couples to the final output voltage via a voltage divider.

14. The method of claim 10 wherein the input port of the comparator circuit is coupled to the feedback signal and the output of the VEA via a first coupling resistor and a second coupling resistor respectively.

15. The method of claim 14 wherein the first coupling resistor and the second coupling resistor have the same resistance value.

\* \* \* \* \*